United States Patent
Lin

(10) Patent No.: US 11,303,865 B2
(45) Date of Patent: Apr. 12, 2022

(54) PROJECTION DEVICE AND AUTO-FOCUS METHOD THEREOF

(71) Applicant: Coretronic Corporation, Hsin-Chu (TW)

(72) Inventor: Hung-Ru Lin, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 17/093,644

(22) Filed: Nov. 10, 2020

(65) Prior Publication Data

US 2021/0152798 A1 May 20, 2021

(30) Foreign Application Priority Data

Nov. 15, 2019 (CN) .......................... 201911116640.8

(51) Int. Cl.
*H04N 9/31* (2006.01)
(52) U.S. Cl.
CPC ........... *H04N 9/3185* (2013.01); *H04N 9/317* (2013.01); *H04N 9/3191* (2013.01)
(58) Field of Classification Search
CPC .... H04N 9/3185; H04N 9/317; H04N 9/3191; G03B 21/53
USPC ........................................................ 346/745
See application file for complete search history.

(56) References Cited

U.S. PATENT DOCUMENTS

| 9,759,994 B1* | 9/2017 | Soyannwo | G06T 19/006 |
| 2005/0078203 A1* | 4/2005 | Akutsu | G03B 21/53 348/240.99 |
| 2005/0094112 A1* | 5/2005 | Eguchi | H04N 9/3194 353/111 |
| 2007/0097328 A1* | 5/2007 | Li | G02B 7/365 353/70 |
| 2008/0122738 A1* | 5/2008 | Yamada | G09G 3/2066 345/60 |
| 2008/0292305 A1* | 11/2008 | Hirai | H04N 9/3194 396/430 |
| 2009/0268172 A1* | 10/2009 | Ke | G03B 21/53 353/101 |
| 2018/0005387 A1* | 1/2018 | Lee | G06T 7/269 |

FOREIGN PATENT DOCUMENTS

TW           I436154           5/2014

* cited by examiner

*Primary Examiner* — Michael Lee
(74) *Attorney, Agent, or Firm* — JCIPRNET

(57) ABSTRACT

A projection device and an auto-focus method thereof are provided. The projection device includes a storage device, an image determining circuit, and an auto-focus circuit. The storage device is configured to temporarily store at least two image signals of image data in different time sequences. The image determining circuit is electrically connected to the storage device and is configured to access the image signals to determine whether a target image signal of the image signals meets an auto-focus condition, wherein the auto-focus condition includes the image determining circuit comparing the image signals to determine whether the target image signal is a static image, so as to correspondingly output a focusing signal. The auto-focus circuit is electrically connected to the image determining circuit and is configured to perform, according to the focusing signal, an auto-focus operation on an image projected by the projection device.

14 Claims, 4 Drawing Sheets

PROJECTION DEVICE AND AUTO-FOCUS METHOD THEREOF

CROSS-REFERENCE TO RELATED APPLICATION

This application claims the priority benefit of China application serial no. 201911116640.8, filed on Nov. 15, 2019. The entirety of the above-mentioned patent application is hereby incorporated by reference herein and made a part of this specification.

BACKGROUND OF THE INVENTION

1. Field of the Invention

The invention relates to a projection technology, and in particular, to a projection device and an auto-focus method thereof.

2. Description of Related Art

A projection device has mobility and can provide display pictures of different sizes, and is a common display device currently. The projection device projects a display picture on a screen for a user to view, and therefore it is very important whether the projection device successfully focuses on the screen to make the user see a clear display picture. Generally, to increase a success probability of focus, a projection device usually projects a specific verification pattern when performing auto-focus. Therefore, the projection device may perform auto-focus by using a logo pattern when the logo pattern is displayed in a start-up process, or the user may manually choose to play the verification pattern in a film projecting process to perform an auto-focus operation. However, projecting the verification pattern in the film projecting process may bother viewing experience. In this case, the timing for performing auto-focus is limited or the projecting process may be interfered. Therefore, how to complete auto-focus without a specific verification pattern becomes an important issue in the current projection technology.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a projection device and an auto-focus method thereof, which can complete auto-focus without being limited to a specific pattern.

Other objectives and advantages of the invention may be further understood from the technical features disclosed in the invention.

To achieve one or some or all of the foregoing objectives or other objectives, an embodiment of the invention provides a projection device, including a storage device, an image determining circuit, and an auto-focus circuit. The storage device is configured to store at least two image signals of image data in different time sequences. The image determining circuit is electrically connected to the storage device, and is configured to access the image signals to determine whether a target image signal of the image signals meets an auto-focus condition, where the auto-focus condition includes that the image determining circuit compares the image signals to determine whether the target image signal is a static image, to correspondingly output a focusing signal. The auto-focus circuit is electrically connected to the image determining circuit, and is configured to perform, according to the focusing signal, an auto-focus operation on an image projected by the projection device.

To achieve one or some or all of the foregoing objectives or other objectives, another embodiment of the invention provides an auto-focus method of a projection device, including the following steps: determining whether a target image signal of at least two image signals in different time sequences meets an auto-focus condition to correspondingly output a focusing signal, where the auto-focus condition includes that the image signals are compared to determine whether the target image signal is correspondingly a static image; and performing, according to the focusing signal, an auto-focus operation on an image projected by the projection device.

Based on the foregoing, the embodiments of the invention have at least one of the following advantages or effects. The projection device and the auto-focus method thereof in the embodiments of the invention can perform an auto-focus operation on a currently projected image of the projection device, provided that the target image signal meets the auto-focus condition. That is, the projection device and the auto-focus method thereof in the embodiments of the invention can perform an auto-focus operation without being limited by a specific calibration pattern.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
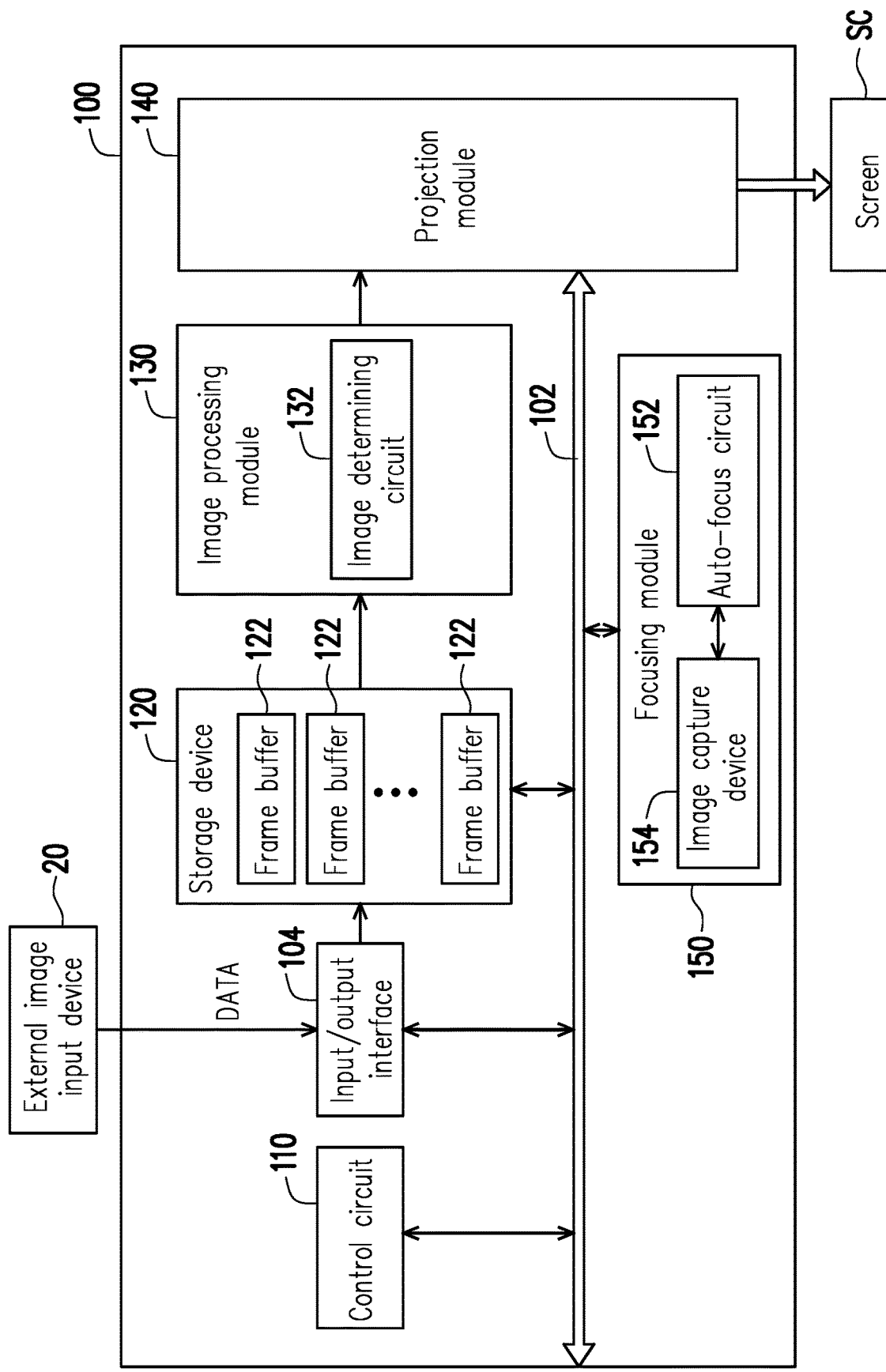
FIG. 1 shows a schematic overview diagram of a projection device according to an embodiment of the invention.
Figure 2:
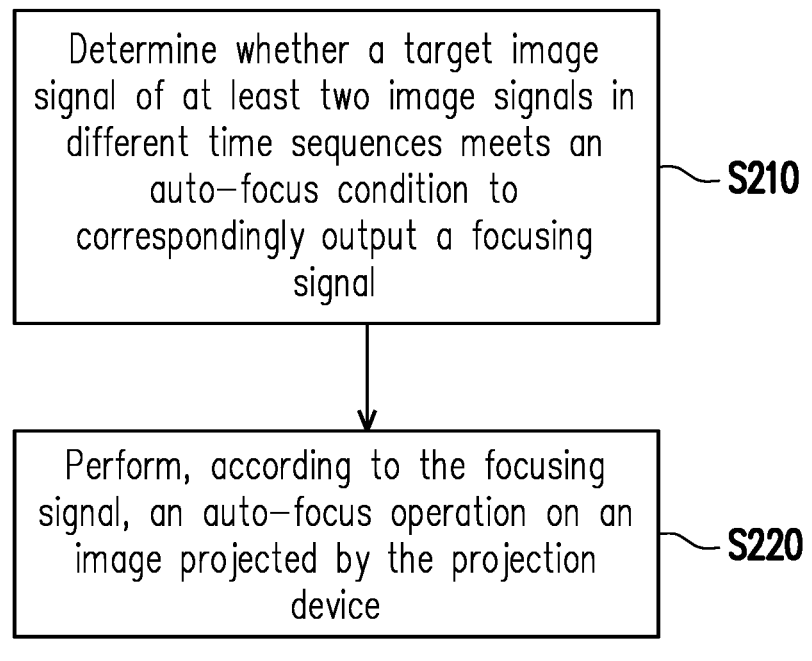
FIG. 2 shows a flowchart of an auto-focus method of a projection device according to an embodiment of the invention.

FIG. 1 shows a schematic overview diagram of a projection device according to an embodiment of the invention, and FIG. 2 shows a flowchart of an auto-focus method of a projection device according to an embodiment of the invention. Referring to FIG. 1 and FIG. 2, in the embodiment, a projection device 100 may be configured to perform an auto-focus method 200 in FIG. 2. The following describes steps of the auto-focus method 200 with reference to various elements in FIG. 1.

In the embodiment of FIG. 1, the projection device 100 may receive image data DATA from an external image input device 20 and project an image to a screen SC according to the image data DATA. The projection device 100 includes a control circuit 110, a storage device 120, an image processing module 130, a projection module 140, and a focusing module 150. The control circuit 110, the storage device 120, the image processing module 130, the projection module 140, and the focusing module 150 may be connected by using a bus 102, but is not limited.

The control circuit 110 is configured to control an operation of the projection device 100. The control circuit 110 is, for example, a central processing unit (CPU), a microcontroller unit (MCU), or another hardware device having a computing capability such as a programmable microprocessor, a digital signal processor (DSP), or a programmable controller, and the invention is not limited thereto. The storage device 120 is configured to temporarily store at least two image signals of the image data DATA in different time sequences. Specifically, the storage device 120 includes a plurality of frame buffers 122, respectively configured to store a plurality of image signals in different time sequences. In the embodiment, in addition to the frame buffers 122, the storage device 120 may further include a fixed or movable random access memory (RAM) of any type, a read-only memory (ROM), a flash memory, a hard disk, a similar element, or a combination of the foregoing elements, but is not limited. The storage device 120 may store the image data DATA or data, an instruction, a program, and the like that may be used in running of the projection device 100. The control circuit 110 is configured to execute a plurality of instructions stored in the storage device 120, to control the projection device 100 to implement the auto-focus method 200.

The image processing module 130 is configured to perform image processing, for example, scaling and wrapping, on an image signal that is obtained through decoding the image data DATA. The image processing module 130 implements the processing in a hardware manner, for example, a wafer form, which is not limited. The projection module 140 includes at least a light valve and a lens group, and the projection module 140 is, for example, a liquid crystal display (LCD) projection module, a digital light processor (DLP) module, or a liquid crystal on silicon (LCoS) projection module. The projection module 140 receives the image signal processed by the image processing module 130, and presents the processed image signal through the light valve. The lens group projects an image to the screen SC and the image is displayed corresponding to the processed image signal is displayed on the screen SC.

In the embodiment, the image processing module 130 includes a image determining circuit 132. The image determining circuit 132 is electrically connected to the storage device 120 to access the at least two image signals, where one of the accessed at least two image signals is selected as a target image signal.

In step S210, the image determining circuit 132 determines, according to the accessed image signals, whether the target image signal meets an auto-focus condition to correspondingly output a focusing signal. In the embodiment, the auto-focus condition includes that the image determining circuit 132 compares the accessed at least two image signals to determine whether the target image signal is a static image. When determining that the target image signal meets the auto-focus condition, the image determining circuit 132 outputs the focusing signal.

The focusing module 150 is configured to perform an auto-focus action. The focusing module 150 includes an auto-focus circuit 152. The auto-focus circuit 152 is electrically connected to the image determining circuit 132 to receive the focusing signal from the image determining circuit 132. In step S220, the auto-focus circuit 152 performs, according to the focusing signal, an auto-focus operation on an image projected by the projection device 100.

The focusing module 150 further includes an image capture device 154. The image capture device 154 is electrically connected to the auto-focus circuit 152. When the auto-focus circuit 152 performs the auto-focus operation, the image capture device 154 is configured to capture the image projected by the projection device 100 to determine whether the auto-focus operation is completed.

Briefly, the projection module 140 displays the image on the screen SC according to the target image signal. On the other hand, the image determining circuit 132 determines that the target image signal meets the auto-focus condition and outputs the focusing signal. The image capture device 154 captures an image that is projected on the screen SC according to the target image signal. The focusing module 150 determines a current focus status according to the image captured by the image capture device 154, and the auto-focus circuit 152 adjusts a focal length of the lens group in the projection module 140 until the focusing module 150 determines that the image on the screen SC is already in a clear state.

In the present embodiment, the projection device 100 further includes an input/output interface 104. The input/output interface 104 is electrically connected between the storage device 120 and the external image input device 20. The external image input device 20 inputs the image data DATA to the storage device 120 of the projection device 100 through the input/output interface 104 of the projection device 100. In another embodiment, alternatively, the projection device 100 may not need to be connected to the external image input device 20, but pre-store the image data DATA in the storage device 120.

The following further describes a determining standard and a completion condition of the auto-focus condition.

Figure 3:
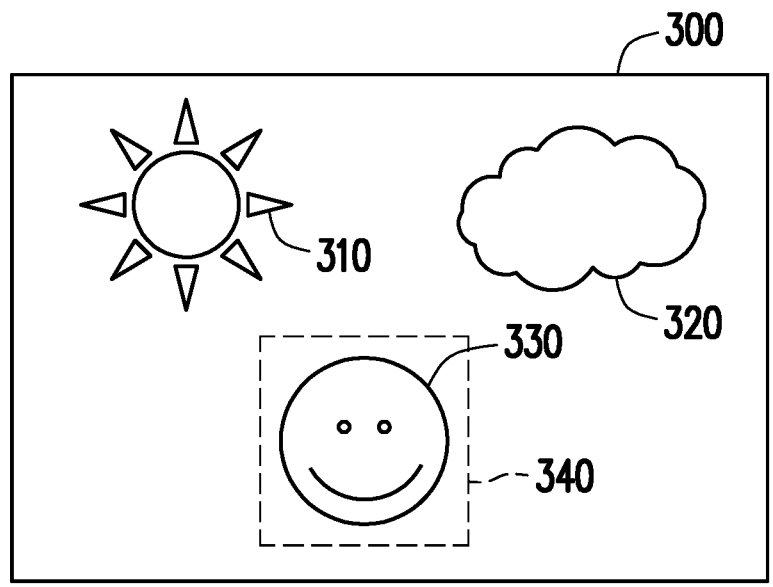
FIG. 3 and FIG. 4 respectively show schematic diagrams of image signals of image data in different time sequences according to an embodiment of the invention.
Figure 4:
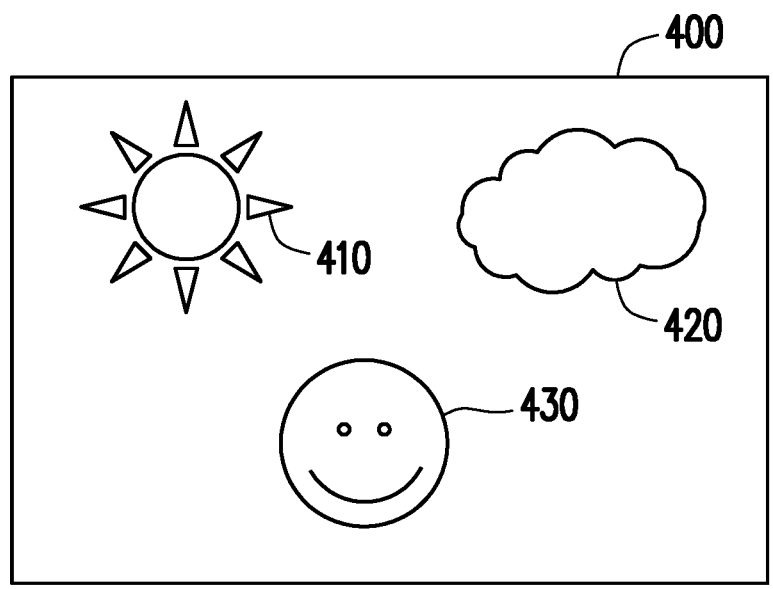

FIG. 3 and FIG. 4 respectively show schematic diagrams of image signals of image data in different time sequences according to an embodiment of the invention. Referring to FIG. 1, FIG. 3, and FIG. 4, the image determining circuit 132 receives the image signals in different time sequences from a plurality of frame buffers 122, to determine whether a target image signal is a static image. To simplify the description, in the embodiment, a plurality of image signals are described by using two image signals 300 and 400 as an example, but are not limited thereto.

The auto-focus condition further includes that the image determining circuit 132 determines whether the target image signal has a pattern or a word. In the embodiment, the image determining circuit 132 discovers that the image signal 300 has patterns 310, 320, and 330, and therefore, the image signal 300 is selected as the target image signal, and the image signal 400 is an image signal in a previous or next time sequence (that is, different time sequences) of the target image signal (the image signal 300).

Then, the image determining circuit 132 compares the image signal 300 and the image signal 400 to determine whether the image signal 300 is a static image. For example, the image determining circuit 132 determines whether image features (for example, the patterns 310, 320, and 330) in the image signal 300 are consistent with image features (for example, patterns 410, 420, and 430) in the image signal 400. In an embodiment, the image features in the image signal 300 are completely consistent with the image features in the image signal 400, and the image determining circuit 132 determines that the current image signal 300 is a static image. In another embodiment, the image signal 300 has some image features same with those of the image signal 400, and some image features of the image signals are different from those of the image signal 400 but the differences are very small. The image determining circuit 132 may still determine that the current image signal 300 is a static image. For example, the pattern 330 and the pattern 430 are totally the same, but the pattern 310 or the pattern 320 and the pattern 410 or the pattern 420 have slight differences that do not affect identification. In other words, the image determining circuit 132 analyzes the image signals of the image data DATA in different time sequences, and if the current image signal is determined to be static, and at least part of image content has details (for example, lines, words, or high-contrast patterns) that are enough for focusing, the image determining circuit 132 outputs a focusing signal to the auto-focus circuit 152 of the focusing module 150, to perform an auto-focus operation on a currently projected image.

The auto-focus circuit 152 determines, according to an image captured by the image capture device 154, whether at least part of the image corresponding to the target image signal (for example, the image signal 300 in FIG. 3) meets a sharpness condition, and the image captured by the image capture device 154 includes an image that is projected on the screen SC by the projection device 100 according to the target image signal. In an embodiment, the auto-focus circuit 152 determines, according to the sharpness, whether words or patterns in the image in the captured image have been clearly focused. When a value of the sharpness of the image is maximum, it indicates that the image is clear, and the auto-focus circuit 152 determines that currently the projection module 140 has focused successfully, to complete the auto-focus operation. In an embodiment, the auto-focus circuit 152 may determine, based only on the sharpness of the pattern 330 in a region 340 of the image signal 300, whether the auto-focus operation is completed.

In an embodiment, when the auto-focus circuit 152 performs an auto-focus operation, the image determining circuit 132 continuously compares the at least two image signals of the image data DATA in different time sequences. If it is determined that a target image signal played next does not meet the auto-focus condition, the auto-focus operation is stopped. In an embodiment, the image determining circuit 132 may output a focusing stop signal to the auto-focus circuit 152, so that the auto-focus circuit 152 stops the auto-focus operation. After the auto-focus operation is stopped, the image determining circuit 132 controls a lens group of the projection module 140 to return to a focal length position before the auto-focus operation is performed.

Figure 5:
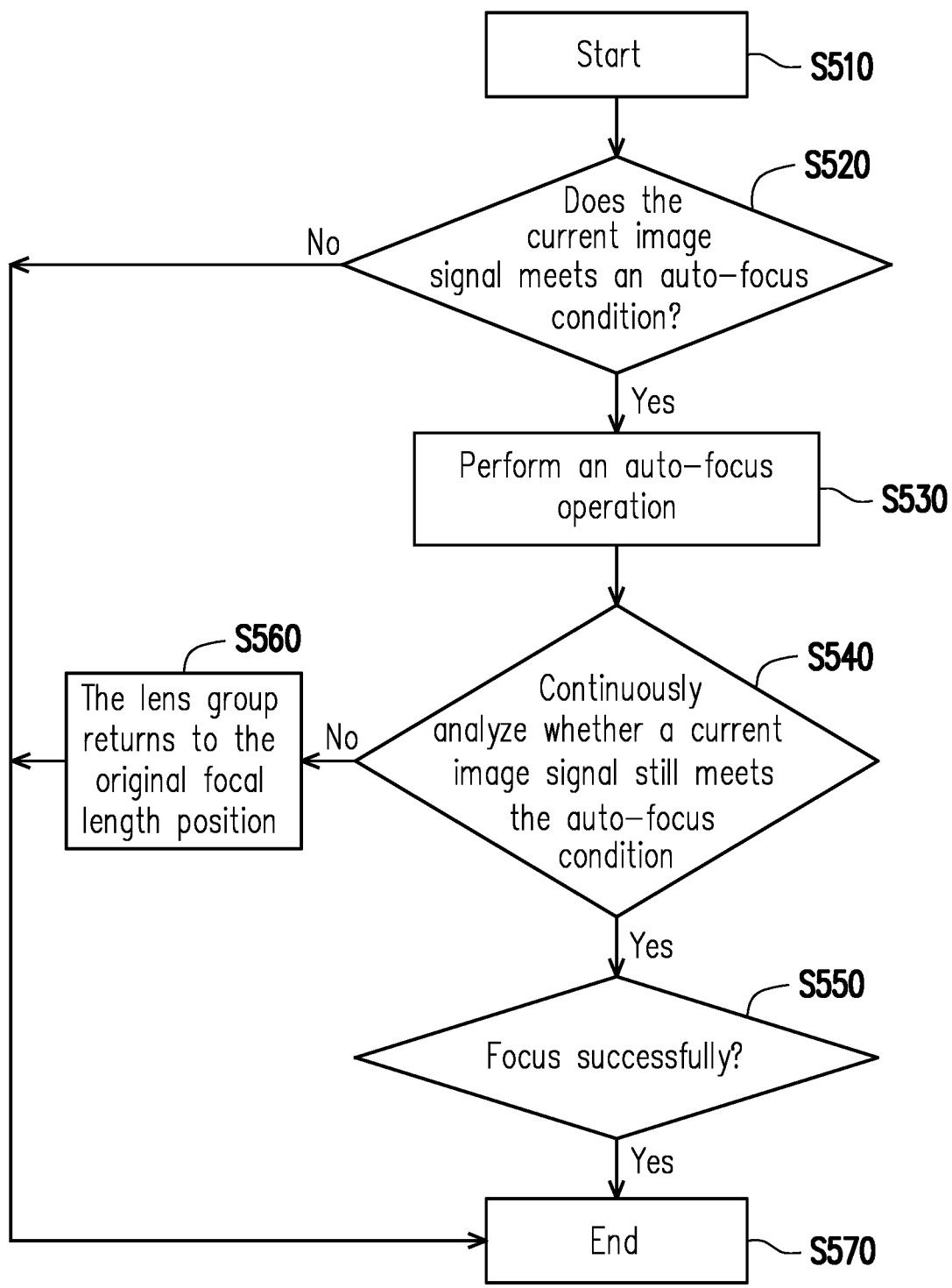
FIG. 5 shows a flowchart of an auto-focus method of a projection device according to another embodiment of the invention.

FIG. 5 shows a flowchart of an auto-focus method of a projection device according to another embodiment of the invention. Referring to FIG. 1 and FIG. 5, an auto-focus method 500 in FIG. 5 is applicable to the embodiments in FIG. 1 to FIG. 4. The following describes an implementation of the auto-focus method 500 with reference to the foregoing element symbols.

In step S510, the auto-focus method 500 is started. In an embodiment, the projection device 100 presets a preset cycle. Every time after the preset cycle, the projection device 100 starts to perform the auto-focus method, and the projection device 100 automatically performs step S520. In another embodiment, a user manually inputs an auto-focus instruction to enter step S520. The user may input the auto-focus instruction in a manner of keys, remote control, or the like, and the invention is not limited thereto.

In step S520, the image determining circuit 132 determines whether a current image signal meets an auto-focus condition. If the current image signal is a static image and has details that are clear enough, the current image signal may be determined to meet the auto-focus condition. When the current image signal meets the auto-focus condition, step S530 is performed; and if not, step S570 is performed to end the auto-focus method 500.

In step S530, an auto-focus operation is performed. The auto-focus circuit 152 adjusts a focal length of a lens of the projection module 140, so that the projection module 140 may project a clear image. Then in step S540, the image determining circuit 132 continuously analyzes whether a current image signal still meets the auto-focus condition. If an image in a next time sequence changes relative to the current image, that is, the current image signal does not meet the auto-focus condition, step S560 is performed, in which the auto-focus circuit 152 adjusts a lens group of the projection module 140 to return to a focal length position before step S510 is started or a preset focal length position, and step S570 is performed to end the auto-focus method 500. If the image picture does not change, step S550 is performed.

In step S550, the auto-focus circuit 152 determines whether the projection module 140 has focused successfully, and whether the image projected by the projection device 100 on the screen SC according to the image signal is clear enough. If the focusing is successfully, step S570 is performed to end the auto-focus method 500. If the projection module 140 has not focused successfully, go back to step S540, and the auto-focus circuit 152 continues to adjust the focal length of the lens of the projection module 140.

For implementation details of the auto-focus method 500, a person skilled in the art may obtain sufficient suggestions, enlightening, and description according to the foregoing descriptions. Therefore, details are not described herein again.

Based on the foregoing, the embodiments of the invention have at least one of the following advantages or effects. In the foregoing embodiments of the invention, a projection device displays a projected image according to image data, and determines whether a target image signal in the image data meets an auto-focus condition, and if yes, the projection device can perform an auto-focus action on the target image signal in the process of playing the image corresponding to the image data without interfering a user viewing content of projection image.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection device, comprising: a storage device, an image determining circuit, and an auto-focus circuit, wherein
the storage device is configured to store at least two image signals of image data in different time sequences;
the image determining circuit s electrically connected to the storage device and is configured to access the at least two image signals to determine whether a target image signal in the at least two image signals meets an auto-focus condition, wherein the at least two image signals comprise the target image signal and a previous or a next image signal of the target image signal, and the auto-focus condition comprises the image determining circuit comparing the at least two image signals to determine whether the target image signal is a static image and determining whether the target image signal comprises at least part of image content having a pattern or a word for focusing, so as to correspondingly output a focusing signal; and
the auto-focus circuit is electrically connected to the image determining circuit and is configured to perform, according to the focusing signal, an auto-focus operation on an image that is projected by the projection device according to the target image signal.

2. The projection device according to claim 1, wherein when the auto-focus circuit performs the auto-focus operation, the image determining circuit continuously compares the at least two image signals of the image data in different time sequences, and if the target image signal is determined as not meeting the auto-focus condition, the auto-focus operation is stopped.

3. The projection device according to claim 1, wherein every time after a preset cycle, the image determining circuit automatically determines whether the current image signal meets the auto-focus condition.

4. The projection device according to claim 1, further comprising:
an image capture device, electrically connected to the auto-focus circuit, wherein when the auto-focus circuit performs the auto-focus operation, the image capture device is configured to capture the image projected by the projection device to confirm whether the auto-focus operation is completed.

5. The projection device according to claim 4, wherein the auto-focus circuit determines whether at least part of the image corresponding to the target image signal meets a sharpness condition.

6. The projection device according to claim 1, further comprising:
an input/output interface, electrically connected between the storage device and an external image input device, wherein the external image input device inputs the image data to the storage device through the input/output interface.

7. The projection device according to claim 1, wherein the storage device comprises a plurality of frame buffers, which are respectively configured to store the at least two image signals in different time sequences.

8. An auto-focus method of a projection device, comprising:
determining whether a target image signal of at least two image signals of image data in different time sequences meets an auto-focus condition to correspondingly output a focusing signal, wherein the at least two image signals comprise the target image signal and a previous or a next image signal of the target image signal, and the auto-focus condition comprises comparing the at least two image signals to determine whether the target image signal corresponds to a static image and determining whether the target image signal comprises a pattern or a word for focusing; and
performing, according to the focusing signal, an auto-focus operation on an image that is projected by the projection device according to the target image signal.

9. The auto-focus method according to claim 8, further comprising:
continuously comparing the at least two image signals of the image data in different time sequences when performing the auto-focus operation, wherein if the target image signal is determined as not meeting the auto-focus condition, the auto-focus operation is stopped.

10. The auto-focus method according to claim 8, wherein after confirming whether the target image signal corresponds to the static image, whether the static image corresponding to the target image signal comprises the pattern or the word is further determined.

11. The auto-focus method according to claim 8, wherein the step of determining whether the target image signal meets the auto-focus condition comprises:
automatically determining whether the current image signal meets the auto-focus condition every time after a preset cycle.

12. The auto-focus method according to claim 8, wherein the step of performing the auto-focus operation according to the focusing signal comprises:
capturing, through an image capture device, the image projected by the projection device to confirm whether the auto-focus operation is completed.

13. The auto-focus method according to claim 12, wherein the step of capturing, through the image capture device, the image projected by the projection device to confirm whether the auto-focus operation is completed comprises:
   determining whether at least part of the image corresponding to the target image signal meets a sharpness condition.

14. The auto-focus method according to claim 8, wherein the at least two image signals are from an external image input device, and the projection device determines, through an image determining circuit, whether the target image signal of the at least two image signals from the external image input device meets the auto-focus condition.

* * * * *